(12) United States Patent
Kanakogi et al.

(10) Patent No.: US 6,609,143 B1
(45) Date of Patent: Aug. 19, 2003

(54) METHOD AND APPARATUS FOR ARITHMETIC OPERATION

(75) Inventors: Tomochika Kanakogi, Takatsuki (JP); Masaitsu Nakajima, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/600,622

(22) PCT Filed: Jan. 21, 1999

(86) PCT No.: PCT/JP99/00237
§ 371 (c)(1),
(2), (4) Date: Jul. 20, 2000

(87) PCT Pub. No.: WO99/38088
PCT Pub. Date: Jul. 29, 1999

(30) Foreign Application Priority Data

Jan. 21, 1998 (JP) .......................................... 10-009371

(51) Int. Cl.[7] .............................................. G06F 7/48
(52) U.S. Cl. ...................................... 708/603; 708/523
(58) Field of Search ................................ 708/603, 523, 708/501, 518

(56) References Cited

U.S. PATENT DOCUMENTS

| 5,784,306 | A | * | 7/1998 | Ogletree | 708/603 |
| 5,941,940 | A | * | 8/1999 | Prasad et al. | 708/523 |
| 6,035,316 | A | * | 3/2000 | Peleg et al. | 708/523 |
| 6,078,939 | A | * | 6/2000 | Story et al. | 708/501 |
| 6,085,213 | A | * | 7/2000 | Oberman et al. | 708/603 |
| 6,298,366 | B1 | * | 10/2001 | Gatherer et al. | 708/523 |

FOREIGN PATENT DOCUMENTS

| JP | 7-44533 | 2/1995 |
| JP | 8-22451 | 1/1996 |
| JP | 10-171778 | 6/1998 |

* cited by examiner

*Primary Examiner*—David H. Malzahn
(74) *Attorney, Agent, or Firm*—McDermott, Will & Emery

(57) ABSTRACT

It is an object of the present invention to provide an arithmetic logic unit that can perform a sum-of-products operation in a reduced number of processing cycles without carrying out data transfer and additions even in obtaining a single result from a plurality of divided input data words.

Data words X and Y are input. A product of the high-order bits of X and Y is calculated using first decoder 511, first selector 521, first partial product generator 531 and first full adder 541. A product of the low-order bits of X and Y is also calculated using second decoder 512, second selector 522, second partial product generator 532 and second full adder 542. These products are adaptively shifted at a shifter 55 and then added up with a fed back data word Z at a third full adder 56 and a carry-propagation adder 58. In this manner, the data word Z, representing the result of the sum-of-products operation, is obtained.

3 Claims, 9 Drawing Sheets

Fig. 11

| operation cycle no. | operation | selector 521 | selector 522 | selector 523 | selector 524 | shifter 621 | shifter 622 | shifter 623 | shifter 624 | CTRL 50 |
|---|---|---|---|---|---|---|---|---|---|---|
| 2Cycle | (XU·YU)>>m; (XL·YU)>>m | YU | YU | 0 | 0 | (32-m)<< | (32-m)<< | m>> | m>> | L |
| | (XU·YU)>>m; (XL·YL)>>m | YU | YL | 0 | 0 | (32-m)<< | (32-m)<< | m>> | m>> | L |
| | (XU·YL)>>m; (XL·YU)>>m | YL | YU | 0 | 0 | (32-m)<< | (32-m)<< | m>> | m>> | L |
| | (XU·YL)>>m; (XL·YL)>>m | YL | YL | 0 | 0 | (32-m)<< | (32-m)<< | m>> | m>> | L |
| | ((XU·YU)>>m)+ZU; ((XL·YU)>>m)+ZL | YU | YU | Z | 0 | (32-m)<< | (32-m)<< | m>> | m>> | L |
| | ((XU·YU)>>m)+ZU; ((XL·YL)>>m)+ZL | YU | YL | Z | 0 | (32-m)<< | (32-m)<< | m>> | m>> | L |
| | ((XU·YL)>>m)+ZU; ((XL·YU)>>m)+ZL | YL | YU | Z | 0 | (32-m)<< | (32-m)<< | m>> | m>> | L |
| | ((XU·YL)>>m)+ZU; ((XL·YL)>>m)+ZL | YL | YL | Z | 0 | (32-m)<< | (32-m)<< | m>> | m>> | L |
| | (X·YU)>>m | YU | YU | 0 | 0 | (16-m)<< | (16-m)<< | m>> | m>> | H |
| | (X·YL)>>m | YL | YL | 0 | 0 | (16-m)<< | (16-m)<< | m>> | m>> | H |
| | (X·YU)>>m+Z | YU | YU | Z | 0 | (16-m)<< | (16-m)<< | m>> | m>> | H |
| | (X·YL)>>m+Z | YL | YL | Z | 0 | (16-m)<< | (16-m)<< | m>> | m>> | H |
| | (XU·YU)>>m+(XL·YU)>>m | YU | YU | 0 | 0 | m>> | m>> | m>> | m>> | H |
| | (XU·YU)>>m+(XL·YL)>>m | YU | YL | 0 | 0 | m>> | m>> | m>> | m>> | H |
| | (XU·YL)>>m+(XL·YU)>>m | YL | YU | 0 | 0 | m>> | m>> | m>> | m>> | H |
| | (XU·YL)>>m+(XL·YL)>>m | YL | YL | 0 | 0 | m>> | m>> | m>> | m>> | H |
| | ((XU·YU)>>m)+((XL·YU)>>m)+Z | YU | YU | Z | 0 | m>> | m>> | m>> | m>> | H |
| | ((XU·YU)>>m)+((XL·YL)>>m)+Z | YU | YL | Z | 0 | m>> | m>> | m>> | m>> | H |
| | ((XU·YL)>>m)+((XL·YU)>>m)+Z | YL | YU | Z | 0 | m>> | m>> | m>> | m>> | H |
| | ((XU·YL)>>m)+((XL·YL)>>m)+Z | YL | YL | Z | 0 | m>> | m>> | m>> | m>> | H |
| 3Cycle | (X·Y)>>m [1st cycle] | YL | YL | 0 | 0 | (16-m)<< | (16-m)<< | (16-m)<< | (16-m)<< | H |
| | (X·Y)>>m [2nd cycle] | YU | YU | 0 | S+C | (32-m)<< | (32-m)<< | m>> | m>> | H |
| | (X·Y)>>m+Z [1st cycle] | YL | YL | Z | 0 | (16-m)<< | (16-m)<< | (16-m)<< | (16-m)<< | H |
| | (X·Y)>>m+Z [2nd cycle] | YU | YU | 0 | S+C | (32-m)<< | (32-m)<< | m>> | m>> | H |

METHOD AND APPARATUS FOR ARITHMETIC OPERATION

TECHNICAL FIELD

The present invention relates to an arithmetic logic unit and arithmetic/logical operation method for realizing high-speed multiply, multiply-and-accumulate and other operations that are frequently used in signal processing.

BACKGROUND ART

In the past, multi-media data was processed using a microprocessor and a dedicated LSI in combination. However, thanks to recent amazing performance enhancement of microprocessors, it is now possible for a microprocessor to execute some types of multi-media data processing by itself. The development of a register-divided operation method was one of the factors contributing to this performance enhancement achieved. Also, in the fields of image processing, audio processing and so on, an operation method of deriving a single accumulated data word from input array elements is often used.

FIG. 12 illustrates a configuration for a known arithmetic logic unit performing a multiply-and-accumulate operation using a divided register.

In FIG. 12, a register 105 stores 32-bit accumulated data words ZU and ZL as its high- and low-order 32 bits, respectively. A multiplier 101 receives and multiplies together the high-order 16 bits of an input 32-bit data word X (hereinafter, referred to as "XU") and the high-order 16 bits of another input 32-bit data word Y (hereinafter, referred to as "YU") and outputs a 32-bit product. A multiplier 102 receives and multiplies together the low-order 16 bits of the input data word X (hereinafter, referred to as "XL") and the low-order 16 bits of the input data word Y (hereinafter, referred to as "YL") and outputs a 32-bit product. An adder 103 adds up the output data of the multiplier 101 and the data word ZU retained as high-order 32 bits in the register 105 and outputs a 32-bit sum. An adder 104 adds up the output data of the multiplier 102 and the data word ZL retained as low-order 32 bits in the register 105 and outputs a 32-bit sum. The output data of the adder 103 is stored as the high-order 32 bits in the register 105, while the output data of the adder 104 is stored as the low-order 32 bits in the register 105.

In the arithmetic logic unit with such a configuration, the multiplier 101 performs the multiplication XU·YU, the adder 103 adds up the product obtained by the multiplier 101 and ZU that has been stored in the high-order 32 bits in the register 105, and the register 105 stores the result of the multiply-and-accumulate operation XU·YU+ZU, which is the output of the adder 103, as its high-order 32 bits.

In the same way, the multiplier 102 performs the multiplication XL·YL, the adder 104 adds up the product obtained by the multiplier 102 and ZL that has been stored as low-order 32 bits in the register 105, and the register 105 stores the result of the multiply-and-accumulate operation XL·YL+ZL, which is the output of the adder 104, as its low-order 32 bits.

Suppose the multiply-and-accumulate operation is performed N times with the array elements shown in FIG. 13 provided as the input data words X and Y to the arithmetic logic unit and with i, or the number of times the data words are input, changed from 0 through N−1. In that case, $(x0 \cdot y0 + x2 \cdot y2 + \ldots + x2n-2 \cdot y2n-2)$ will be stored as the result of the operation in the high-order 32 bits of the register 105, while $(x1 \cdot y1 + x3 \cdot y3 + \ldots + x2n-1 \cdot y2n-1)$ will be stored as the result of the operation in the low-order 32 bits of the register 105.

Problems to be Solved

However, the conventional arithmetic logic unit must perform the multiply-and-accumulate operation N times and then add together $(x0 \cdot y0 + x2 \cdot y2 + \ldots + x2n-2 \cdot y2n-2)$ stored in the high-order 32 bits in the register 105 and $(x1 \cdot y1 + x3 \cdot y3 + \ldots + x2n-1 \cdot y2n-1)$ stored in the low-order 32 bits in the register 105 to obtain $(x0 \cdot y0 + x1 \cdot y1 + x2 \cdot y2 + \ldots + x2n-2 \cdot y2n-2 + x2n-1 \cdot y2n-1)$.

To carry out this addition, only the high-order 32 bits of the data stored in the register 105 should be transferred to another register and only the low-order bits of the data stored in the register 105 should be transferred to still another register (or the same register as that receiving the high-order 32 bits). Then, these data bits transferred must be added together.

As can be seen, to obtain a single accumulation result from multiple input data words divided, the conventional arithmetic logic unit needs to perform not only the multiply-and-accumulate operation but also data transfer and addition, thus adversely increasing its processing cycle.

An object of the present invention is providing an arithmetic logic unit that can obtain a single accumulation result from multiple input data words divided without performing the data transfer and addition.

DISCLOSURE OF INVENTION

To solve this problem, an inventive arithmetic logic unit according to the present invention receives (n×M)-bit data words X and Y and outputs a single independent data word Z, where X and Y are each composed of a number n of M-bit data units that are independent of each other. The arithmetic logic unit includes: $1^{st}$ through $n^{th}$ multipliers, each multiplying together associated data units with the same digit position of the data words X and Y; $1^{st}$ through $n^{th}$ shifters, each being able to perform bit shifting on an output of associated one of the $1^{st}$ through $n^{th}$ multipliers; and an adder for adding up outputs of the $1^{st}$ through $n^{th}$ shifters. If a sum of the outputs of the $1^{st}$ through $n^{th}$ multipliers is obtained as the data word Z, the $1^{st}$ through $n^{th}$ shifters perform no bit shifting. But if the outputs of the $1^{st}$ through $n^{th}$ multipliers are obtained separately for the data word Z, the $1^{st}$ through $n^{th}$ shifters perform a bit-shifting control in such a manner that the outputs of the $1^{st}$ through $n^{th}$ multipliers are shifted to respective digit positions not overlapping each other.

In such a configuration, a multiply-and-accumulate operation can be performed with the number of steps reduced. Also, by switching the modes of control performed by the shifter, multiple lines of multiplication can be performed in parallel.

To solve the above problem, an inventive arithmetic logic unit according to the present invention receives (n×M)-bit data words X and Y and outputs a single independent data word Z, where X and Y are each composed of a number n of M-bit data units that are independent of each other. The arithmetic logic unit includes: a register for storing the data word Z; $1^{st}$ through $n^{th}$ multipliers, each multiplying together associated data units with the same digit-position of the data words X and Y; and an adder for adding up outputs of the $1^{st}$ through $n^{th}$ multipliers and an output of the register and inputting the sum to the register. The arithmetic logic unit performs a sum-of-products operation with the data words X and Y input for multiple cycles.

In such a configuration, even though an increased number of inputs should be provided to a multi-input adder, the increase in circuit size of the adder can be relatively small. Thus, a multiply-and-accumulate operation is realizable with the increase in circuit size minimized.

To solve the above problem, an inventive arithmetic logic unit according to the present invention receives (n×M)-bit data words X and Y and outputs a single independent data word Z, where X and Y are each composed of a number n of M-bit data units that are independent of each-other. The arithmetic logic unit includes: a register for storing the data word Z; $1^{st}$ through $n^{th}$ multipliers, each multiplying together associated data units with the same digit position of the data words X and Y; $1^{st}$ through $n^{th}$ shifters, each being able to perform bit shifting on an output of associated one of the $1^{st}$ through $n^{th}$ multipliers; and an adder for adding up outputs of the $1^{st}$ through nth shifters and an output of the register and inputting the sum to the register. In performing a sum-of-products operation with the data words X and Y input for multiple cycles, if a cumulative sum of products of the $1^{st}$ through $n^{th}$ multipliers is obtained as the data word Z, the $1^{st}$ through $n^{th}$ shifters perform no bit shifting. But if the sums of products of the $1^{st}$ through $n^{th}$ multipliers are obtained separately for the data word Z, the $1^{st}$ through $n^{th}$ shifters perform such a control that the outputs of the $1^{st}$ through $n^{th}$ multipliers are shifted to respective digit positions not overlapping each other.

In such a configuration, a sum-of-products operation can be performed with the number of steps reduced. Also, by switching the modes of control performed by the shifter, multiple lines of sum-of-products operations can be performed in parallel.

To solve the above problem, an inventive arithmetic logic unit according to the present invention receives (n×M)-bit data words X and Y and outputs a data word Z, where X and Y are each composed of a number n of M-bit data units. The arithmetic logic unit is characterized by including: a register for storing the data word Z; a selector for selecting one of the number n of data units of which the data word Y is made up; $1^{st}$ through $n^{th}$ multipliers, each selecting one of the number n of data units, of which the data word X is made up, and multiplying together the data unit selected and an output of the selector, the data units selected by the multipliers not overlapping each other; $1^{st}$ through $n^{th}$ shifters, each being able to perform bit shifting on an output of associated one of the $1^{st}$ through $n^{th}$ multipliers; and an adder for adding up outputs of the $1^{st}$ through $n^{th}$ shifters and an output of the register and inputting the sum to the register. The arithmetic logic unit is also characterized in that in a $p^{th}$ cycle, the selector selects a $p^{th}$ least significant one of the data units- and a $q^{th}$ least significant one of the shifters performs a bit shifting control by (p+q−2)M bits.

In this configuration, even a multiplicand with a bit number equal to or greater than the number of bits input to the multipliers included in the arithmetic logic unit can be multiplied.

To solve the above problem, an inventive arithmetic logic unit according to the present invention receives 2M-bit data words X and Y and outputs a 4M-bit data word Z. The arithmetic logic unit includes: a first register for storing bit-by-bit carries C resulting from additions; a second register for storing bit-by-bit sums S resulting from the additions; a third register for storing the data word Z; a first decoder for receiving and decoding high-order M bits of the data word X; a second decoder for receiving and decoding low-order M bits of the data word X; first and second selectors, each selecting either high- or low-order M bits of the data word Y; a first partial product generator for receiving output data of the first decoder and the first selector and generating partial products for a multiply-and-accumulate operation; a second partial product generator for receiving output data of the second decoder and the second selector and generating partial products for the multiply-and-accumulate operation; a first full adder for adding up the partial products generated by the first partial product generator; a second full adder for adding up the partial products generated by the second partial product generator; a data extender/shifter that receives output data of the first and second full adders and can perform data extension and data shifting on the data; a carry-propagation adder for receiving, and performing a carry-propagation addition on, the bit-by-bit carries C and the bit-by-bit sums S that have been stored in the first and second registers and outputting the result to the third register; a third selector for selectively outputting either the data stored in the third register or zero data; a fourth selector for selectively outputting either the output data of the carry-propagation adder or zero data; and a third full adder for receiving, and performing a full addition on, the output data of the data extender/shifter and the output data of the third and fourth selectors and for inputting the bit-by-bit carries C and the bit-by-bit sums S to the first and second registers, respectively.

In such a configuration, a sum-of-products operation can be performed with the number of steps and the circuit size both reduced. Also, by switching the modes of control performed by the shifter, multiple lines of sum-of-products operations can be performed in parallel or a multiplicand with a bit number equal to or greater than the number of bits input to the multipliers can be multiplied with the circuit size reduced.

A solution worked out by the present invention is an arithmetic/logical operation method for calculating a single independent data word Z from input (n×M)-bit data words X and Y, where X and Y are each composed of a number n of M-bit data units that are independent of each other. The method includes the steps of: multiplying together associated data units with the same digit position of the data words X and Y, thereby obtaining respective products; shifting bits of the products obtained in the multiplying step; and adding up values obtained in the shifting step, thereby obtaining a sum. If a sum of the number n of products obtained in the multiplying step is calculated as the data word Z, no bit shifting is performed in the shifting step. But if the number n of products are obtained separately in the multiplying step for the data word Z, bit-shifting is performed in the shifting step in such a manner that the number n of products are shifted to respective digit positions not overlapping each other.

According to the present invention, a multiply-and-accumulate operation can be performed with the number of steps reduced.

A solution worked out by the present invention is an arithmetic/logical operation method for calculating a single independent data word Z from input (n×M)-bit data words X and Y, where X and Y are each composed of a number n of M-bit data units that are independent of each other. The method includes the steps of: multiplying together associated data units with the same digit position of the data words X and Y, thereby obtaining respective products; adding up the number n of products obtained in the multiplying step, thereby obtaining a sum; and performing a sum-of-products operation on the sums obtained in the adding step with the data words X and Y input for multiple cycles.

According to the present invention, a multiply-and-accumulate operation can be performed with the increase in circuit size minimized.

A solution worked out by the present invention is an arithmetic/logical operation method for calculating a single independent data word Z from input (n×M)-bit data words X and Y, where X and Y are each composed of a number n of M-bit data units that are independent of each other. The method includes the steps of: multiplying together associated data units with the same digit position of the data words X and Y, thereby obtaining respective products; shifting bits of the products obtained in the multiplying step; adding up values obtained in the shifting step, thereby obtaining a sum; and performing a sum-of-products operation on the sums obtained in the adding step with the data words X and Y input for multiple cycles. If a cumulative sum of the number n of products, which have been generated in the multiplying step, is obtained as the data word Z, no bit shifting is performed in the shifting step. But if the sums of the number n of products, which have been generated in the multiplying step, are obtained separately for the data word Z, bits of the number n of products are shifted to respective digit positions not overlapping each other in the shifting step.

BRIEF DESCRIPTION OF DRAWINGS

FIG. 11 illustrates various types of operations performed by the arithmetic logic unit shown in FIG. 1.

BEST MODE FOR CARRYING OUT THE INVENTION

Hereinafter, embodiments of the present invention will be described with reference to the accompanying drawings.

Figure 1:
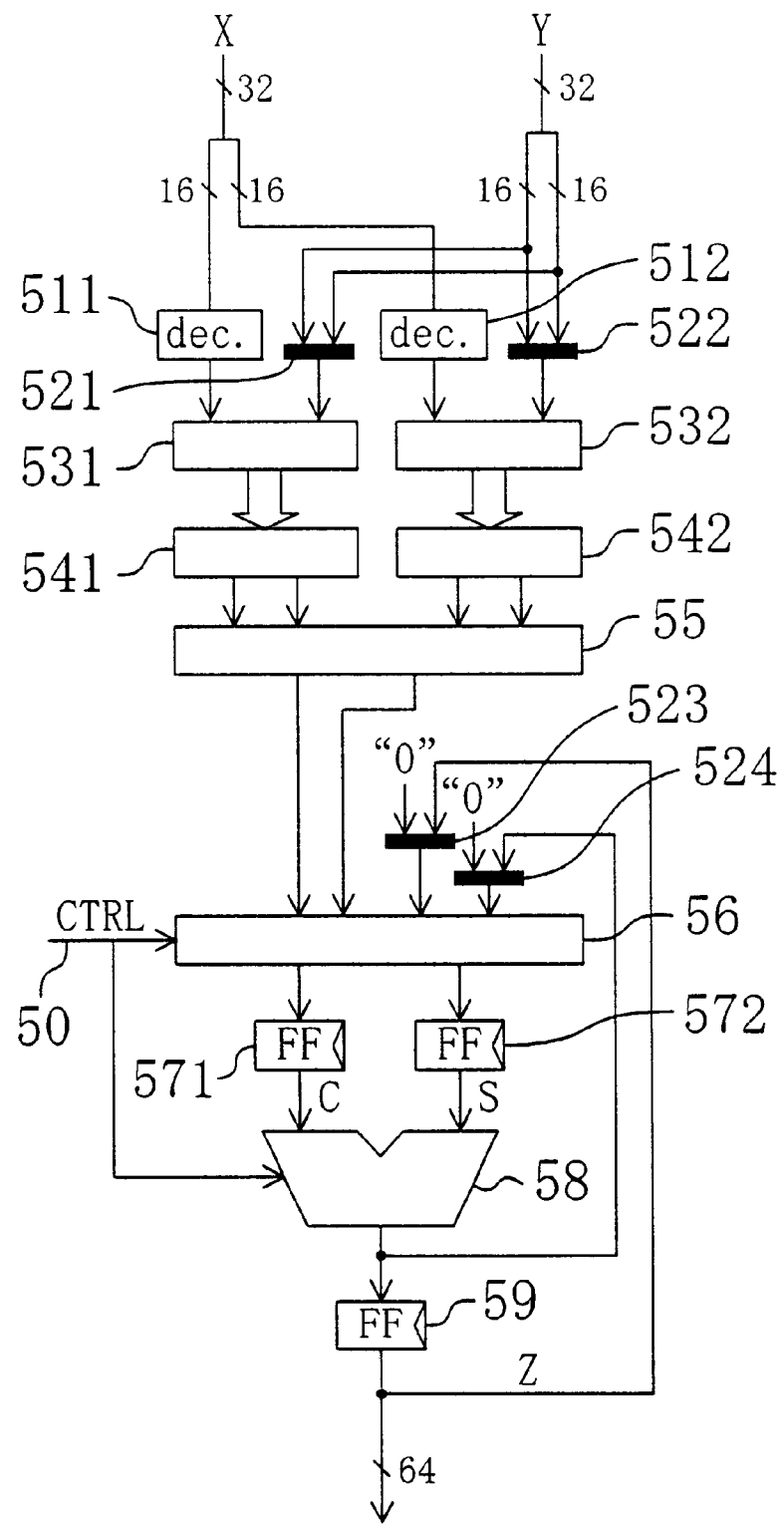
FIG. 1 illustrates a configuration for an arithmetic logic unit according to an embodiment of the present invention.

FIG. 1 illustrates a schematic configuration for an arithmetic logic unit according to an embodiment of the present invention. In FIG. 1, X and Y are 32-bit input data words, each composed of two independent 16-bit data half-words, and Z is a 64-bit accumulated data word. S and C are 64-bit intermediate data words, which are collections of bit-by-bit sums and carries, respectively. These intermediate data words S and C are herein used because in performing additions repeatedly, obtaining sums and carries on a bit-by-bit basis and then a sum of all the bits at last would be more efficient than obtaining the sum of all the bits every time. Booth decoders 511 and 512 decode XU and XL, respectively, and output the results. Each of selectors 521 and 522 selects and outputs YU or YL. A partial product generator 531 receives the output data of the first decoder 511 and the data selected by the first selector 521 and generates and outputs partial products for multiplication. A partial product generator 532 receives the output data of the second decoder 512 and the data selected by the second selector 522 and generates and outputs partial products for multiplication. Full adders 541 and 542 perform full addition on the partial products generated by the first and second partial product generators 531 and 532, respectively, and then output the results. A data extender/shifter 55 receives, and performs data extension and shifting on, the output data of the first and second full adders 541 and 542, and outputs the results. A third selector 523 selectively outputs "0" or the data word Z stored in a third register 59. A fourth selector 524 selectively outputs "0" or the output S+C of a carry-propagation adder 58. A full adder 56 receives, and performs full addition on, the data that has been extended and shifted by the data extender/shifter 55 and the data that has been selected by the third and fourth selectors 523 and 524, thereby outputting the 64-bit intermediate data words C and S. Registers 571 and 572 store the data words C and S, which are the outputs of the third full adder 56. The carry-propagation adder 58 receives, and performs carry-propagation addition on, the data words C and S that have been stored in the first and second registers 571 and 572, respectively, and then outputs the result S+C. The register 59 stores the output of the carry-propagation adder 58.

Figure 2:
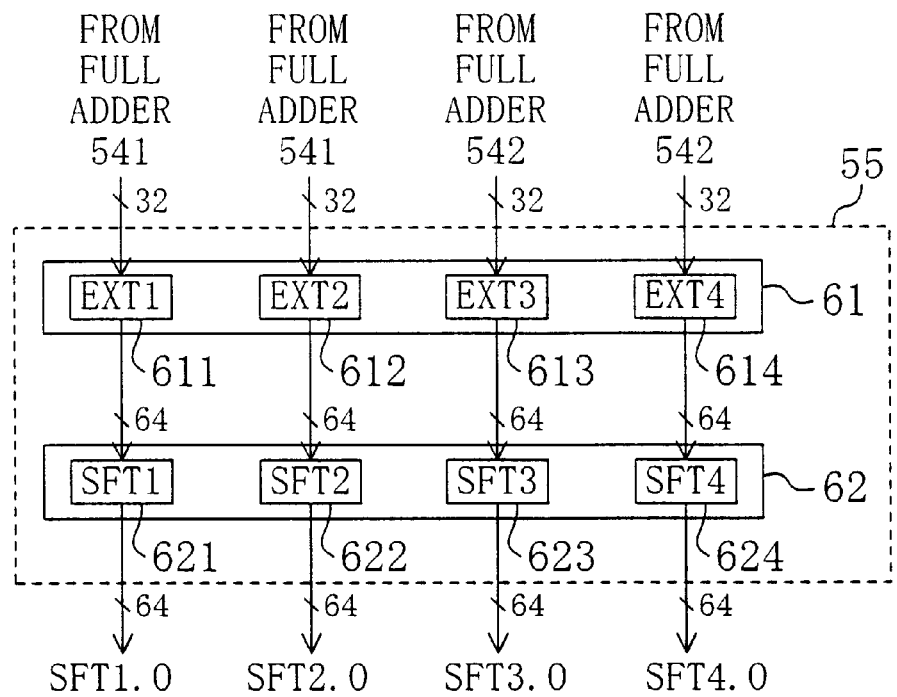
FIG. 2 illustrates a detailed configuration for a data extender/shifter according to the embodiment of the present invention.

FIG. 2 illustrates a detailed configuration for the data extender/shifter 55. In FIG. 2, a data extension section 61, consisting of data extenders 611 through 614, performs sign or zero extension on the input data and outputs the results. A data shifting section 62, consisting of data shifters 621 through 624, receives, and performs data shifting on, the output data of the data extension section and outputs the results. In FIG. 2, SFT1.O through SFT4.O are output data words of the data shifters 621 through 624, respectively.

Figure 3:
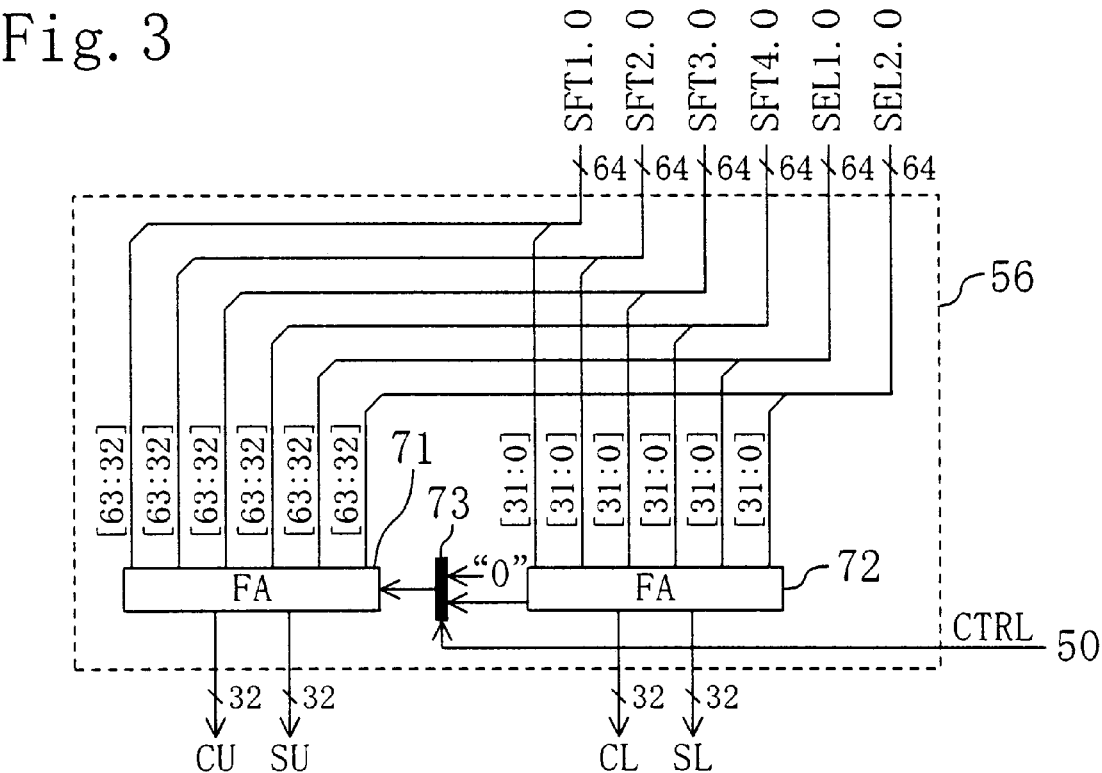
FIG. 3 illustrates a detailed configuration for a third full adder according to the embodiment of the present invention.

Next, FIG. 3 illustrates a detailed configuration for the third full adder 56. In FIG. 3, a full adder 72 receives, and performs full addition on, the respective low-order 32 bits of the output data words SFT1.O through SFT4.O of the data shifters 621 through 624 and those of the output data words SEL1.O and SEL2.O of the third and fourth selectors 523 and 524. A selector 73 selects either an overflow signal of the fourth full adder 72 or "0" and outputs the result. Specifically, while a control signal CTRL 50 is "H", the fifth selector 73 selects the overflow signal of the fourth full adder 72 and outputs it to a fifth full adder 71. On the other hand, while the control signal CTRL 50 is "L", the fifth selector 73 selects "0" and outputs it to the fifth full adder 71. The full adder 71 receives, and performs full addition on, the respective high-order 32 bits of the output data words SFT1.O through SFT4.O of the data shifters 621 through 624, those of the output data words SEL1.O and SEL2.O of the third and fourth selectors 523 and 524 and the output data of the fifth selector 73. In FIG. 3, CU and SU are output data words of the fifth full adder 71, while CL and SL are output data words of the fourth full adder 72.

Figure 4:
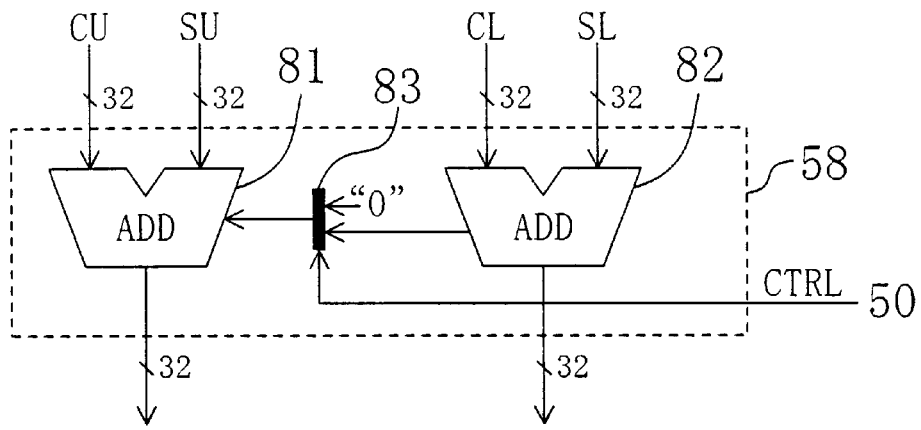
FIG. 4 illustrates a detailed configuration for a carry-propagation adder according to the embodiment of the present invention.

Next, FIG. 4 illustrates a detailed configuration for the carry-propagation adder 58.

In FIG. 4, a carry-propagation adder 82 receives, and performs carry-propagation addition on, CL and SL, which have been stored as low-order 32 bits in the first and second registers 571 and 572, respectively, and outputs the result. A selector 83 selects either an overflow signal of the carry-propagation adder 82 or "0" and outputs the result. Specifically, while the control signal CTRL 50 is "H", the sixth selector 83 selects the overflow signal of the carry-propagation adder 82 and outputs it to a carry-propagation adder 81. On the other hand, while the control signal CTRL 50 is "L", the sixth selector 83 selects "0" and outputs it to the carry-propagation adder 81. The carry-propagation adder 81 receives, and performs carry-propagation addition on, CU and SU, which have been stored as high-order 32 bits in the first and second registers 571 and 572, respectively, and the output data of the sixth selector 83 and then outputs the result.

Hereinafter, it will be described how the arithmetic logic unit with such a configuration operates.

(1) First, an arithmetic/logical operation for obtaining a single independent accumulated data word from two divided input data words will be described. In the following example, an operation of obtaining (x0·y0+x1·y1+x2·y2+ . . . +x2n-2·y2n-2+x2n-1·y2n-1) from the input array elements shown in FIG. 13 will be explained. Also, in the following example, a signed multiply-and-accumulate operation will be performed as the arithmetic/logical operation for illustrative purposes. In this case, the operation will be executed on the supposition that the control signal CTRL 50 is "H".

In FIG. 1, the first and second selectors 521 and 522 select YU and YL, respectively, for the first cycle. Thus, the first and second partial product generators 531 and 532 generate respective partial products for multiplications XU·YU and XL·YL. The first full adder 541 performs full addition on the partial products generated by the first partial product generator 531, thereby outputting two 32-bit intermediate data words for the multiplication XU·YU. In the same way, the second full adder 542 outputs two 32-bit intermediate data words for the multiplication XL·YL.

The two 32-bit intermediate data words, output from the first full adder 541, are input to the data extenders 611 and 612 of the data extender/shifter 55 so as to be sign-extended to 64 bits. These data words, which have been sign-extended by the data extenders 611 and 612, are input to the data shifters 621 and 622, respectively. The data shifters 621 and 622 do not perform any data shifting but just output the two 64-bit intermediate data words for the multiplication XU·YU.

In the same way, the two 32-bit intermediate data words, output from the second full adder 542, are input to the data extenders 613 and 614 of the data extender/shifter 55 so as to be sign-extended to 64 bits. These data words, which have been sign-extended by the data extenders 613 and 614, are input to the data shifters 623 and 624, respectively. The data shifters 623 and 624 do not perform any data shifting either, but just output the 64-bit intermediate data words for the multiplication XL·YL.

The fourth selector 524 selects "0" and then outputs it to the third full adder 56. On the other hand, the third selector 523 selects the 64-bit data word Z, which has been stored in the third register 59, and outputs it to the third full adder 56.

The third full adder 56 receives, and performs full addition on, the outputs SFT1.O through SFT4.O of the data extender/shifter and the outputs SEL1.O and SEL2.O of the third and fourth selectors 523 and 524. In this case, since the control signal CTRL 50 is "H", the overflow signal of the fourth full adder 72 is input to the fifth full adder 71. As a result, the overflow propagates from the $31^{st}$ to the $32^{nd}$ bit in the 64-bit full addition operation.

Figure 5:
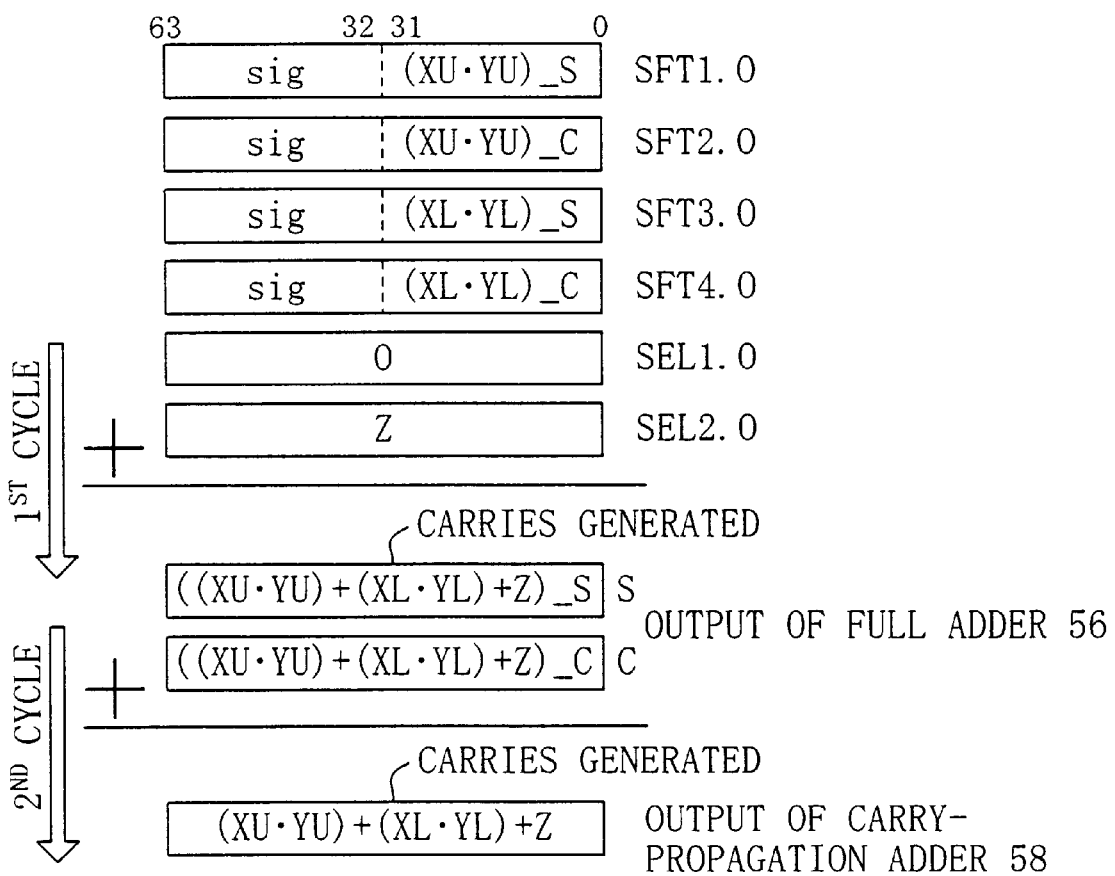
FIG. 5 illustrates how the arithmetic logic unit shown in FIG. 1 performs a multiply-and-accumulate operation.

Accordingly, the third full adder 56 outputs two 64-bit intermediate data words C and S for the multiply-and-accumulate operation (XU·YU+XL·YL+Z) as shown in FIG. 5.

These 64-bit intermediate data words C and S are stored in the first and second registers 571 and 572, respectively.

In the second cycle, the carry-propagation adder 58 receives, and performs carry-propagation addition on, the two 64-bit intermediate data words C and S that have been stored in the first and second registers 571 and 572. In this case, since the control signal CTRL 50 is "H", the overflow signal of the carry-propagation adder 82 is input to the carry-propagation adder 81. As a result, the overflow signal propagates from the $31^{st}$ to the $32^{nd}$ bit in the 64-bit carry-propagation addition operation.

Accordingly, the carry-propagation adder 58 outputs the result of the multiply-and-accumulate operation (XU·YU+ XL·YL+Z) as shown in FIG. 5. The third register 59 stores the output data of the carry-propagation adder 58.

Figure 6:
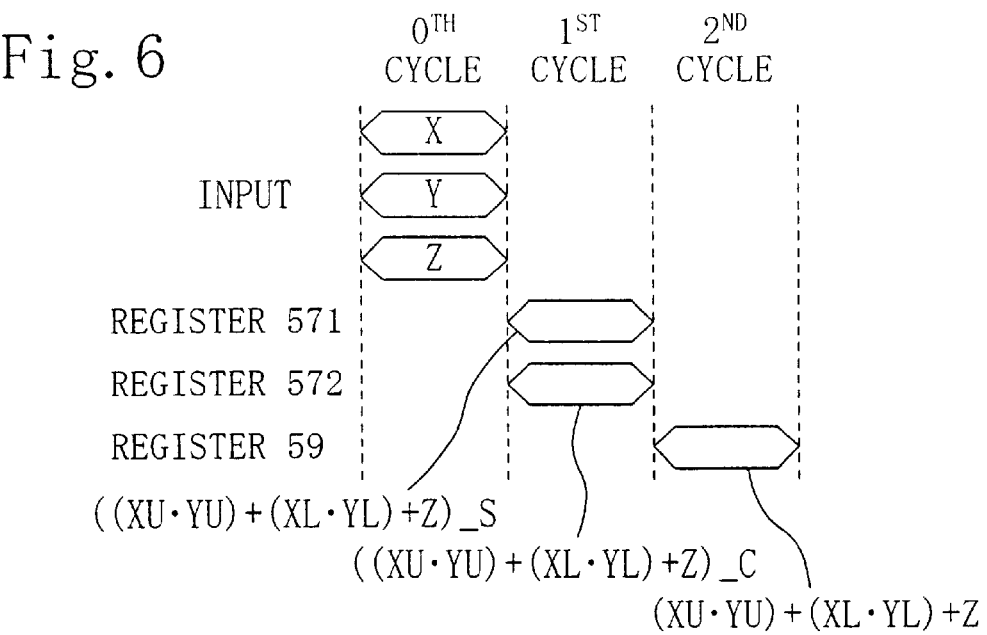
FIG. 6 is a timing diagram illustrating the multiply-and-accumulate operation performed by the arithmetic logic unit shown in FIG. 1.

In this manner, the arithmetic logic unit can obtain a single 64-bit accumulated data word in two cycles as shown in FIG. 6 by performing a multiply-and-accumulate operation on the input 32-bit data words X and Y, each composed of two 16-bit data half-words.

Figures 12, 13:
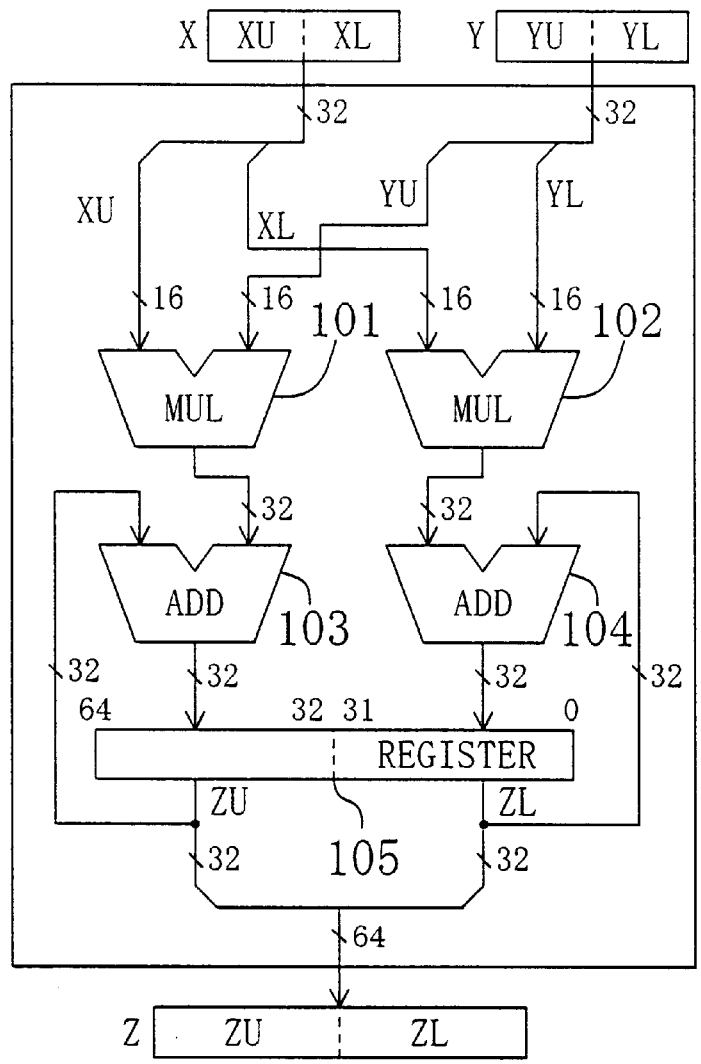
FIG. 12 illustrates a configuration for a conventional arithmetic logic unit with a divided register.
FIG. 13 illustrates array elements for a multiply-and-accumulate operation.

Accordingly, the arithmetic logic unit can obtain (x0·y0+ x1·y1+x2·y2+ . . . +x2n-2·y2n-2+x2n-1·y2n-1) just by performing the multiply-and-accumulate operation N times on the input array elements shown in FIG. 13. That is to say, the arithmetic logic unit needs no data transfer and addition indispensable for known arithmetic logic units.

Figure 8:
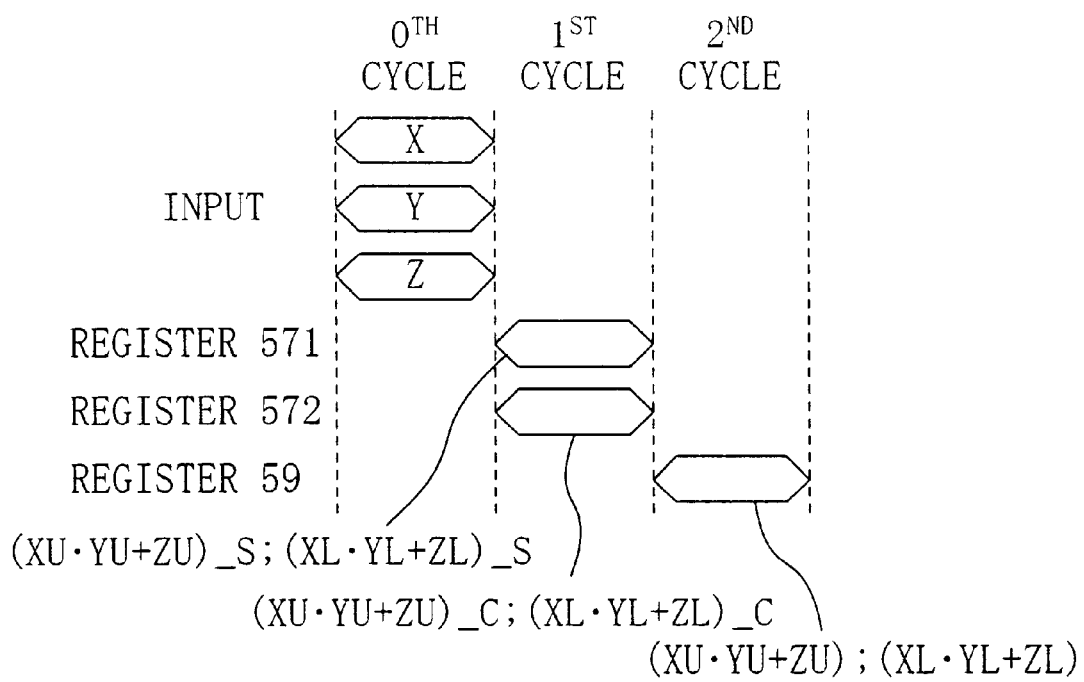
FIG. 8 is a timing diagram illustrating the dual multiply-and-accumulate operation performed by the arithmetic logic unit shown in FIG. 1.

(2) Next, an arithmetic/logical operation of obtaining two independent accumulated data words from two divided input data words will be described. In the following example, it will be described how to obtain two 32-bit accumulated data words in two cycles as shown in FIG. 8 by performing an arithmetic/logical operation on two input 32-bit data words X and Y, each composed of two 16-bit data half-words. Also, in the following example, a signed dual multiply-and-accumulate operation will be performed as the arithmetic/ logical operation for illustrative purposes. In this case, the operation will be executed on the supposition that the control signal CTRL 50 is "L".

In FIG. 1, the first and second selectors 521 and 522 select YU and YL, respectively, for the first cycle. Thus, the first and second partial product generators 531 and 532 generate respective partial products for multiplications XU·YU and XL·YL. The first full adder 541 performs full addition on the partial products generated by the first partial product generator 531, thereby outputting two 32-bit intermediate data words for the multiplication XU·YU. In the same way, the second full adder 542 outputs two 32-bit intermediate data words for the multiplication XL·YL.

The two 32-bit intermediate data words, output from the first full adder 541, are input to the data extenders 611 and 612 of the data extender/shifter 55 so as to be zero-extended to 64 bits. These data words, which have been zero-extended by the data extenders 611 and 612, are input to the data shifters 621 and 622, respectively. The data shifters 621 and 622 shift these data words to the left by 32 bits, thereby outputting two 64-bit intermediate data words for an operation (XU·YU)<<32.

In the same way, the two 32-bit intermediate-data words, output from the second full adder 542, are input to the data extenders 613 and 614 of the data extender/shifter 55 so as to be zero-extended to 64 bits. These data words, which have been zero-extended by the data extenders 613 and 614, are input to the data shifters 623 and 624, respectively. The data shifters 623 and 624 do not perform any data shifting but just output these two 64-bit intermediate data words for the multiplication XL·YL.

The fourth selector 524 selects "0" and then outputs it to the third full adder 56. On the other hand, the third selector 523 selects the 64-bit data word Z, which has been stored in the third register 59, and outputs it to the third full adder 56.

The third full adder 56 receives, and performs full addition on, the outputs SFT1.O through SFT4.O of the data extender/shifter 55 and the outputs SEL1.O and SEL2.O of the third and fourth selectors 523 and 524. In this case, since the control signal CTRL 50 is "L", "0" is input to the fifth full adder 71. Accordingly, no overflow propagates from the $31^{st}$ to the $32^{nd}$ bit in the 64-bit full addition operation.

Figure 7:
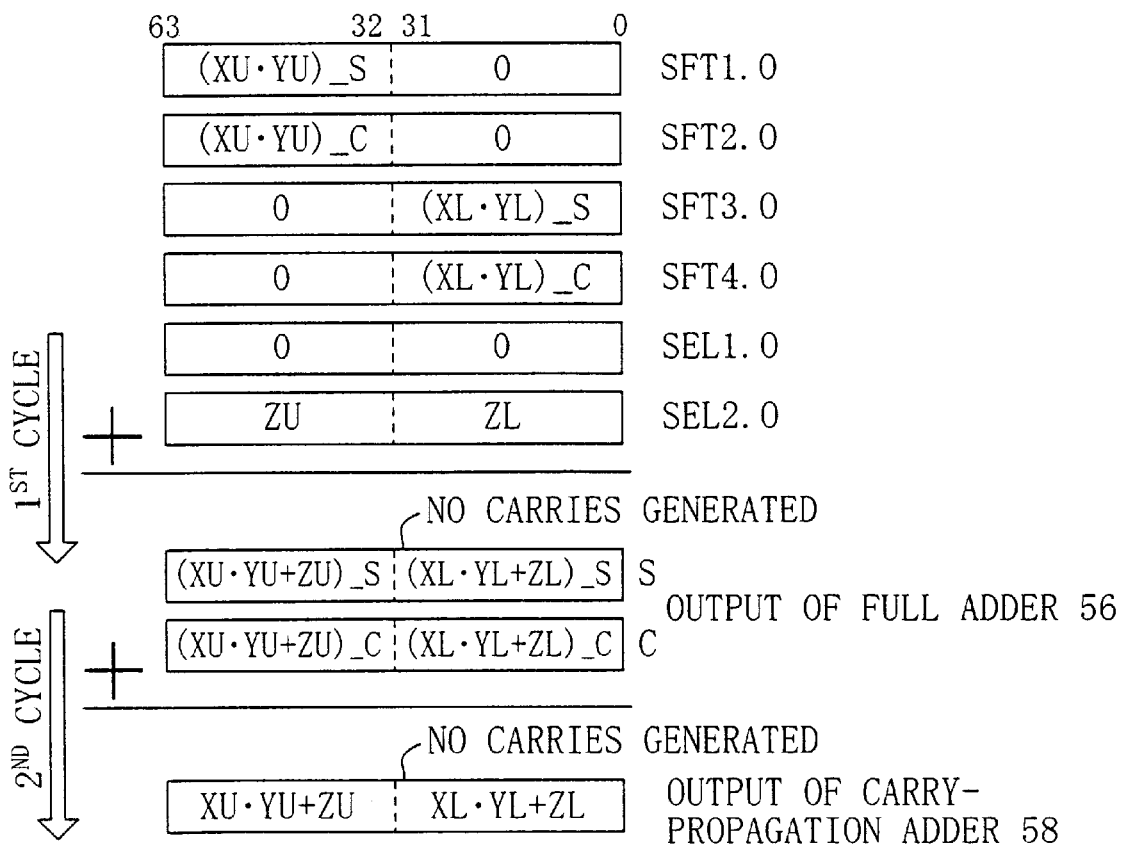
FIG. 7 illustrates how the arithmetic logic unit shown in FIG. 1 performs a dual multiply-and-accumulate operation.

As a result, the third full adder 56 outputs intermediate data words C and S, of which the high-order 32 bits represent the operation (XU·YU+ZU) and the low-order 32 bits represent the operation (XL·YL+ZL), as shown in FIG. 7. These 64-bit intermediate data words C and S are stored in the first and second registers 571 and 572, respectively.

In the second cycle, the carry-propagation adder 58 receives, and performs carry-propagation addition on, the two 64-bit intermediate data words C and S that have been stored in the first and second registers 571 and 572. In this case, since the control signal CTRL 50 is "IL", "0" is input to the carry-propagation adder 81. As a result, no overflow signal propagates from the $31^{st}$ to the $32^{nd}$ bit in the 64-bit carry-propagation addition operation.

Accordingly, the carry-propagation adder 58 outputs the high-order 32 bits as a result of the operation (XU·YU+ZU) and the low-order 32 bits as a result of the operation (XL·YL+ZL) as shown in FIG. 7. The third register 59 stores the output data of the carry-propagation adder 58.

In this manner, the arithmetic logic unit can obtain two 32-bit accumulated data words in two cycles as shown in FIG. 8 by performing an operation on the input 32-bit data words X and Y, each composed of two 16-bit data halfwords.

(3) Next, it will be described how to perform an arithmetic/logical operation on non-divided input data. In the following example, an operation of obtaining a 64-bit product by performing multiplication on input 32-bit data words X and Y will be explained. Also, in the following example, a signed multiplication operation will be performed as the arithmetic/logical operation for illustrative purposes. In this case, the operation will be executed on the supposition that the control signal CTRL 50 is "H".

In FIG. 1, the first and second selectors 521 and 522 select YU and YL, respectively, for the first cycle. Thus, the first and second partial product generators 531 and 532 generate respective partial products for multiplications XU·YU and XL·YL. The first full adder 541 performs full addition on the partial products generated by the first partial product generator 531, thereby outputting two 32-bit intermediate data words for the multiplication XU·YU. In the same way, the second full adder 542 outputs two 32-bit intermediate data words for the multiplication XL·YL.

The two 32-bit intermediate data words, output from the first full adder 541, are input to the data extenders 611 and 612 of the data extender/shifter 55 so as to be sign-extended to 64 bits. These data words, which have been sign-extended by the data extenders 611 and 612, are input to the data shifters 621 and 622, respectively. The data shifters 621 and 622 perform arithmetic shift on these data words to the left by 32 bits, thereby outputting two 64-bit intermediate data words for a multiplication (XU·YU)<<32.

In the same way, the two 32-bit intermediate data words, output from the second full adder 542, are input to the data extenders 613 and 614 of the data extender/shifter 55 so as to be sign-extended to 64 bits. These data words, which have been sign-extended by the data extenders 613 and 614, are input to the data shifters 623 and 624, respectively. The data shifters 623 and 624 do not perform any data shifting but just output the two 64-bit intermediate data words for the operation XL·YL.

The third and fourth selectors 523 and 524 both select "0" and then outputs it to the third full adder 56.

The third full adder 56 receives, and performs full addition on, the outputs SFT1.O through SFT4.O of the data extender/shifter 55 and the outputs SEL1.O and SEL2.O of the third and fourth selectors 523 and 524. In this case, since the control signal CTRL 50 is "H", the overflow signal of the fourth full adder 72 is input to the fifth full adder 71. As a result, the overflow propagates from the $31^{st}$ to the $32^{nd}$ bit in the 64-bit full addition operation.

Figure 9:
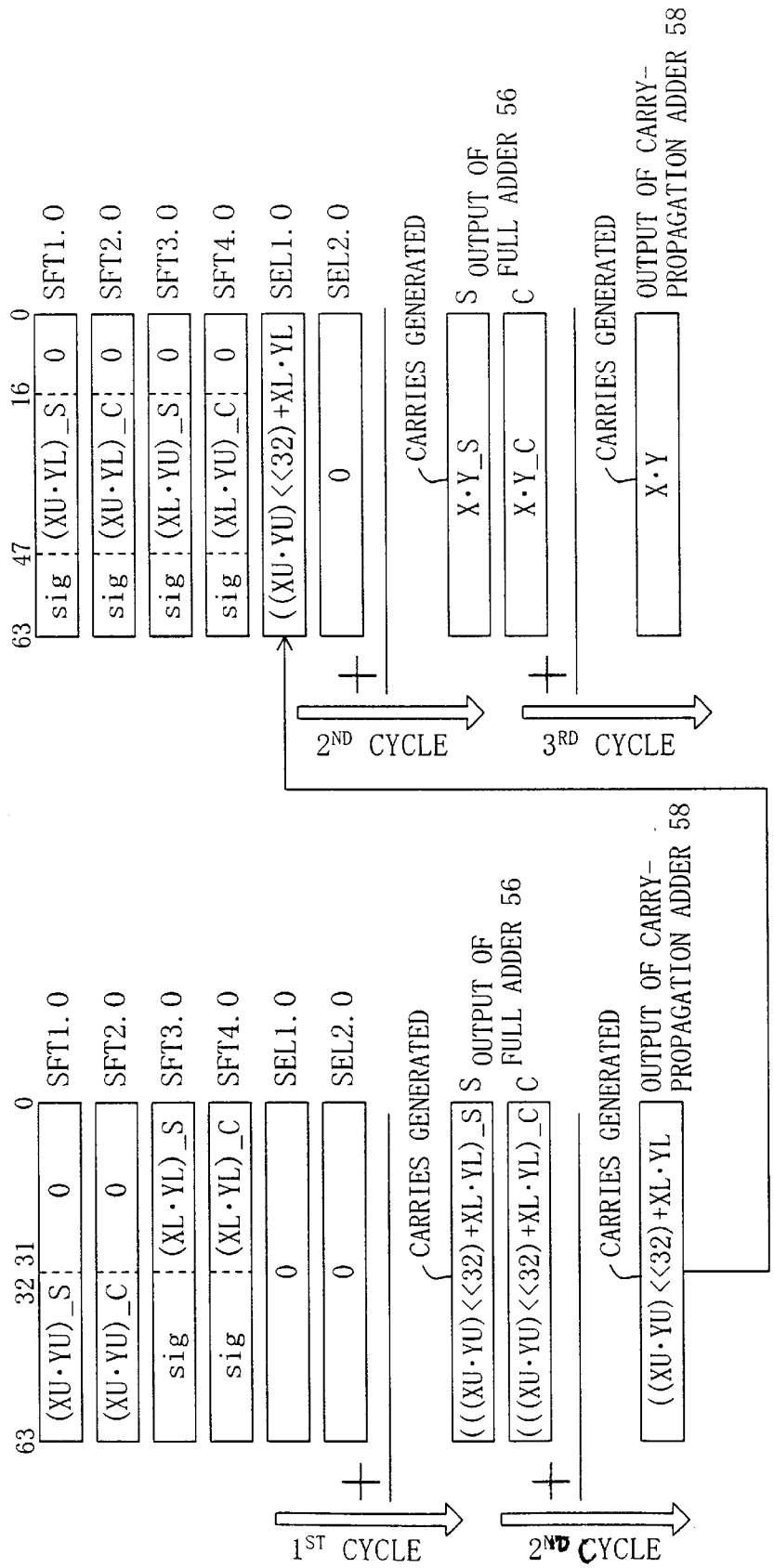
FIG. 9 illustrates how the arithmetic logic unit shown in FIG. 1 performs a multiplication.

Accordingly, the third full adder 56 outputs two 64-bit intermediate data words C and S for the multiply-and-accumulate operation (((XU·YU)<<32)+XL·YL) as shown in FIG. 9.

These 64-bit intermediate data words C and S are stored in the first and second registers 571 and 572, respectively.

In the second cycle, the carry-propagation adder 58 receives, and performs carry-propagation addition on, the two 64-bit intermediate data words C and S that have been stored in the first and second registers 571 and 572. In this case, since the control signal CTRL 50 is "H", the overflow signal of the carry-propagation adder 82 is input to the carry-propagation adder 81. As a result, the overflow signal propagates from the $31^{st}$ to the $32^{nd}$ bit in the 64-bit carry-propagation addition operation.

Accordingly, the carry-propagation adder 58 outputs the result of the multiply-and-accumulate operation (((XU·YU)<<32)+XL·YL) as shown in FIG. 9.

The first and second selectors 521 and 522 also select YL and YU, respectively. Thus, the first and second partial product generators 531 and 532 generate respective partial products for multiplications XU·YL and XL·YU. The first full adder 541 performs full addition on the partial products generated by the first partial product generator 531, thereby outputting two 32-bit intermediate data words for the multiplication XU·YL. In the same way, the second full adder 542 outputs two 32-bit intermediate data words for the multiplication XL·YU.

The two 32-bit intermediate data words, output from the first full adder 541, are input to the data extenders 611 and 612 of the data extender/shifter 55 so as to be sign-extended to 64 bits. These data words, which have been sign-extended by the data extenders 611 and 612, are input to the data shifters 621 and 622, respectively. The data shifters 621 and 622 shift these data words to the left by 16 bits, thereby outputting two 64-bit intermediate data words for a multiplication (XU·YL)<<16.

In the same way, the two 32-bit intermediate data words, output from the second full adder 542, are input to the data extenders 613 and 614 of the data extender/shifter 55 so as to be sign-extended to 64 bits. These data words, which have been sign-extended by the data extenders 613 and 614, are input to the data shifters 623 and 624, respectively. The data shifters 623 and 624 shift these data words to the left by 16 bits, thereby outputting two 64-bit intermediate data words for the operation (XL·YU)<<16.

The third and fourth selectors 523 and 524 select "0" and the output of the carry-propagation adder 58, respectively, and then output them to the third full adder 56.

The third full adder 56 receives, and performs full addition on, the outputs SFT1.O through SFT4.O of the data extender/shifter and the outputs SEL1.O and SEL2.O of the third and fourth selectors 523 and 524. In this case, since the control signal CTRL 50 is "H", the overflow signal of the fourth full adder 72 is input to the fifth full adder 71. As a result, the overflow propagates from the $31^{st}$ to the $32^{nd}$ bit in the 64-bit full addition operation.

Accordingly, the third full adder 56 outputs two 64-bit intermediate data words C and S for the operation (((XU·YU)<<32)+XL·YL)+(((XU·YL)<<16)+((XL·YU)<<16)) as shown in FIG. 9. These 64-bit intermediate data words C and S are stored in the first and second registers 571 and 572, respectively.

In the third cycle, the carry-propagation adder 58 receives, and performs carry-propagation addition on, the two 64-bit intermediate data words C and S that have been stored in the first and second registers 571 and 572. In this case, since the control signal CTRL 50 is "H", the overflow signal of the carry-propagation adder 82 is input to the carry-propagation adder 81. As a result, the overflow signal propagates from the $31^{st}$ to the $32^{nd}$ bit in the 64-bit carry-propagation addition operation.

Accordingly, the carry-propagation adder 58 outputs the result of the operation (((XU·YU)<<32)+XL·YL)+(((XU·YL)<<16)+((XL·YU)<<16)), i.e., the result of the multiplication X Y, as shown in FIG. 9.

Figure 10:
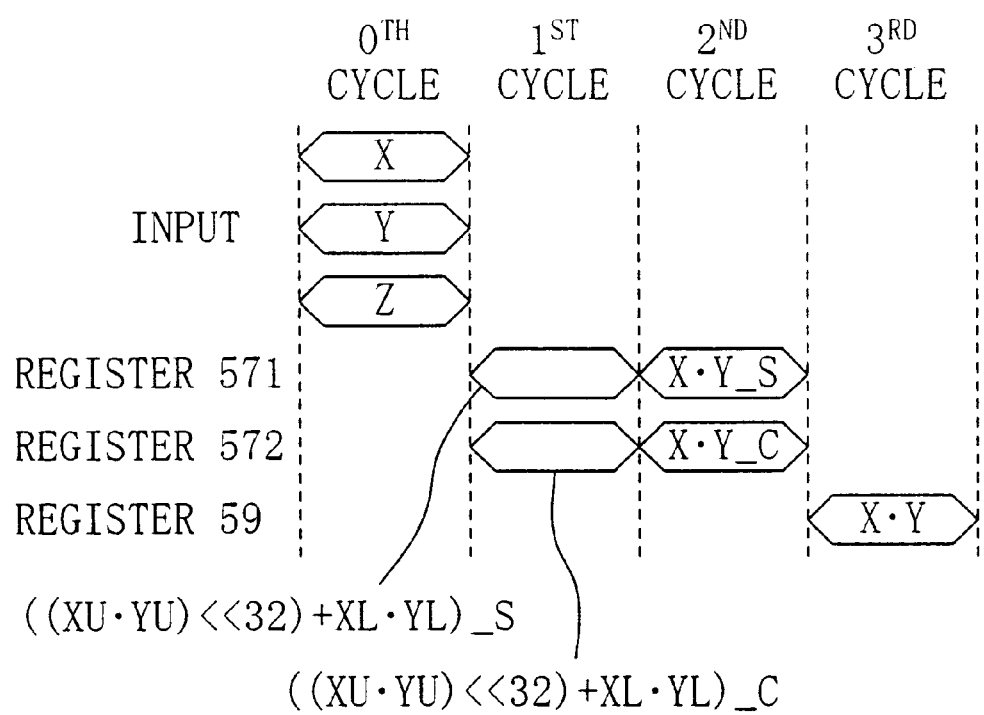
FIG. 10 is a timing diagram illustrating the multiplication performed by the arithmetic logic unit shown in FIG. 1.

In this manner, the arithmetic logic unit can obtain a 64-bit product in three cycles as shown in FIG. 10 by performing multiplication on the input 32-bit data words X and Y.

The arithmetic logic unit shown in FIG. 1 can execute various arithmetic/logical operations other than those exemplified above.

FIG. 11 illustrates those operations and their controls. In FIG. 11, the first through fourth selectors 521 through 524 represent the data words selected and the shifters 621 through 624 represent the numbers of bits shifted and the directions thereof. m<< represents shifting to the left by m bits, while m>> represents shifting to the right by m bits. S+C is the output of the carry-propagation adder 58.

The selectors and shifters belong to the first stage of the two-pipeline-stage arithmetic logic unit. Thus, controls for the first cycle are described for the two-cycle operations, and controls for the first and second cycles are described for the three-cycle operations.

In FIG. 1, the outputs of the third and fourth selectors 523 and 524 are input to the third full adder 56. However, the same effects are attainable even if those outputs are input to the first and second full adders 541 and 542, respectively.

Also, the arithmetic logic unit shown in FIG. 1 has a two-stage pipeline structure. Alternatively, the same effects are attainable even when the arithmetic logic unit has a multi-stage pipeline structure.

Furthermore, in the foregoing embodiment, data words are input and subjected to arithmetic/logical operations with the register divided into two. Similar effects are attainable, however, if more than two divided data words are input.

Effects

As is apparent from the foregoing description, the present invention is advantageous in that no data transfer and addition processes are needed even in obtaining a single independent accumulated data word from multiple divided input data words. In addition, the present invention is also advantageous in that the various types of operations shown in FIG. 11 are executable.

INDUSTRIAL APPLICABILITY

As can be understood from the foregoing description, the inventive arithmetic logic unit and arithmetic/logical operation method are effectively applicable to image or audio processing and is suitably applicable to multi-media data processing including these types of processing.

What is claimed is:

1. An arithmetic logic unit for receiving data words X and Y and outputting a data word Z, where X and Y are each composed of a predetermined plural number of data units, each data unit having a predetermined number of bits, comprising:

a register for storing and outputting a received data as the data word Z;

a plurality of selectors, each selecting and outputting one of the plurality of data units of which the data word Y is made up;

a plurality of multipliers respectively corresponding to the plurality of selectors, each of the plurality of multipliers multiplying together the data unit of the data word Y selected by the corresponding selector and a corresponding data unit of the plurality of data units of which the data word X is made up and outputting the result;

a shifter for bit shifting each output of the plurality of multipliers according to digit positions of the data unit in the data word X and the data unit in the data word Y which are input to each of the plurality of multipliers and outputting the result; and an adder for accumulating an output of the shifter and inputting the sum to the register, wherein a series of operations are repeated in which the respective selectors select a data unit that has not been selected by the respective selectors from the data units of the data word Y, the shifter performs the bit shifting, and the adder performs the accumulation.

2. An arithmetic logic unit for receiving 2M-bit data words X and Y and outputting a 4M-bit data word Z, characterized by comprising:

a first register for storing bit-by-bit carries C resulting from additions;

a second register for storing bit-by-bit sums S resulting from the additions;

a third register for storing the data word Z;

a first decoder for receiving and decoding high-order M bits of the data word X;

a second decoder for receiving and decoding low-order M bits of the data word X;

first and second selectors, each selecting either high- or low-order M bits of the data word Y;

a first partial product generator for receiving output data of the first decoder and the first selector and generating partial products for a multiply-and-accumulate operation;

a second partial product generator for receiving output data of the second decoder and the second selector and generating partial products for the multiply-and-accumulate operation;

a first full adder for adding up the partial products generated by the first partial product generator;

a second full adder for adding up the partial products generated by the second partial product generator;

a data extender/shifter that receives output data of the first and second full adders and can perform data extension and data shifting on the data;

a carry-propagation adder for receiving, and performing a carry-propagation addition on, the bit-by-bit carries C and the bit-by-bit sums S that have been stored in the first and second registers and outputting the result to the third register;

a third selector for selectively outputting either the data stored in the third register or zero data;

a fourth selector for selectively outputting either the output data of the carry-propagation adder or zero data; and a third full adder for receiving, and performing a full addition on, the output data of the data extender/shifter and the output data of the third and fourth selectors and for inputting the bit-by-bit carries C and the bit-by-bit sums S to the first and second registers, respectively.

3. An arithmetic logic unit for receiving data words X and Y and outputting a data word Z, where X and Y are each composed of a predetermined plural number of data units, each data unit having a predetermined number of bits, comprising:

a register for storing and outputting a received data as a data word Z;

a plurality of selectors, each selecting and outputting one of the plurality of data units of which the data word Y is made up;

a plurality of multipliers respectively corresponding to the plurality of selectors, each of the plurality of multipliers multiplying together the data unit of the data word Y selected by the corresponding selector and a corresponding data unit of the plurality of data units of which the data word X is made up and outputting the result;

a shifter for bit shifting each output of the plurality of multipliers according to necessity and outputting the result; and an adder for accumulating an output of the shifter or for adding an output of the shifter and an output of the register and for inputting the sum to the register, wherein a first operation, a second operation and a third operation are selectively performed, wherein the first operation is a repetition of a series of operation in which the respective selectors select a data unit that has not been selected by the respective selectors from the data units of the data word Y, the shifter bit shifts each output of the plurality of multipliers according to digit positions of the data unit in the data word X and the data unit in the data word Y which are input to each of the plurality of multipliers, and the adder performs the accumulation, wherein the second operation is performed in such a manner that each of the plurality of selectors selects a data unit of the data word Y which has the same digit position as that of the data unit of the data word X which is input to the corresponding multiplier of the plurality of multipliers and the adder performs the addition, and wherein the third operation is performed in such a manner that each of the plurality of selectors selects a data unit of the data word Y which has the same digit position as that of the data unit of the data word X which is input to the corresponding multiplier of the plurality of multipliers, the shifter bit shifts the outputs of the plurality of multipliers to respective digit positions not overlapping each other, and the adder performs the addition.

* * * * *